(12) United States Patent
Choi et al.

(10) Patent No.: US 7,652,418 B2
(45) Date of Patent: Jan. 26, 2010

(54) ELECTRONIC EMISSION DEVICE, ELECTRON EMISSION DISPLAY DEVICE HAVING THE SAME, AND METHOD OF MANUFACTURING THE ELECTRON EMISSION DEVICE

(75) Inventors: Young-Chul Choi, Suwon-si (KR); Jong-Hwan Park, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 436 days.

(21) Appl. No.: 11/586,494

(22) Filed: Oct. 26, 2006

(65) Prior Publication Data
US 2008/0018228 A1    Jan. 24, 2008

(30) Foreign Application Priority Data
Oct. 31, 2005   (KR) .................. 10-2005-0103449

(51) Int. Cl.
| H01J 1/62 | (2006.01) |
| H01J 63/04 | (2006.01) |
| H01J 1/46 | (2006.01) |
| H01J 21/10 | (2006.01) |
| H01J 1/02 | (2006.01) |
| H01J 9/24 | (2006.01) |
| H01J 9/00 | (2006.01) |
| H01J 9/12 | (2006.01) |
| H01J 9/04 | (2006.01) |

(52) U.S. Cl. .............. 313/497; 313/306; 313/309; 313/310; 313/495; 313/496; 445/23; 445/46; 445/51; 977/742; 977/743; 977/765; 977/876

(58) Field of Classification Search ............... 313/306, 313/309–310, 495–497; 445/46, 51, 23; 977/876, 742, 743, 765
See application file for complete search history.

(56) References Cited

U.S. PATENT DOCUMENTS

| 6,448,701 | B1 * | 9/2002 | Hsu ..................... 313/309 |
| 7,147,831 | B2 * | 12/2006 | Liu et al. ............ 423/447.2 |
| 2004/0009115 | A1 * | 1/2004 | Wee et al. ........... 423/447.3 |
| 2004/0189182 | A1 * | 9/2004 | Liu et al. .............. 313/495 |
| 2005/0077813 | A1 * | 4/2005 | Lee ....................... 313/495 |
| 2005/0127351 | A1 * | 6/2005 | Tolt ......................... 257/10 |
| 2007/0261140 | A1 * | 11/2007 | Liang ..................... 977/876 |

OTHER PUBLICATIONS

Elongation of vertically well-aligned carbon nanofiber bundles and their field emission characteristics by Kim et al.*

* cited by examiner

*Primary Examiner*—Toan Ton
*Assistant Examiner*—Zachary Snyder
(74) *Attorney, Agent, or Firm*—Stein McEwen, LLP

(57) ABSTRACT

An electron emission device which can uniformly emit electrons and can be simply manufactured at a reduced cost, and a display apparatus having improved uniform brightness of pixels by using the electron emission device. In addition, a simple method of manufacturing the electron emission device. The electron emission device includes: a first substrate; a cathode electrode and an electron emission unit disposed on the first substrate; a gate electrode electrically insulated from the cathode electrode; an insulating layer disposed between the cathode electrode and the gate electrode to insulate the cathode electrode from the gate electrode; and an electron emission source including carbon nanotubes (CNTs) that contact the cathode electrode, wherein distances between the gate electrode and the tips of the CNTs are uniform.

12 Claims, 4 Drawing Sheets

ELECTRONIC EMISSION DEVICE, ELECTRON EMISSION DISPLAY DEVICE HAVING THE SAME, AND METHOD OF MANUFACTURING THE ELECTRON EMISSION DEVICE

CROSS-REFERENCE TO RELATED APPLICATIONS

This application claims the benefit of Korean Patent Application No. 2005-103449, filed on Oct. 31, 2005, in the Korean Intellectual Property Office, the disclosure of which is incorporated herein in its entirety by reference.

BACKGROUND OF THE INVENTION

1. Field of the Invention

Aspects of the present invention relate to an electron emission device, an electron emission display apparatus having the electron emission device, and a method of manufacturing the electron emission device, and more particularly, to an electron emission device having a structure in which a voltage applied to an electron emission source is uniformly distributed, an electron emission display apparatus having the electron emission device to increase brightness uniformity of pixels, and a method of manufacturing the electron emission device.

2. Description of the Related Art

Generally, electron emission devices use a thermal cathode or a cold cathode as an electron emission source. Electron emission devices that use a cold cathode as an electron emission source include field emission device (FED) type devices, surface conduction emitter (SCE) type devices, metal insulator metal (MIM) type devices, metal insulator semiconductor (MIS) type devices, ballistic electron surface emitting (BSC) type devices, etc.

An FED type electron emission device uses the principle that when a material having a low work function or a high β function is used as an electron emission source, the material readily emits electrons in a vacuum due to an electric potential. Devices that employ a tapered tip structure formed of, for example, Mo or Si as a main component, a carbon group material such as graphite, diamond like carbon (DLC), etc., or a nano structure such as nanotubes, nano wires, etc., have been developed. Typically FED type electron emission devices comprise an array of electron emitters, in which case they may be referred to as field emitter array (FEA) devices.

In an SCE type electron emission device, an electron emission source includes a conductive thin film having micro cracks between first and second electrodes facing each other on a substrate. The electron emission device makes use of the principle that electrons are emitted from the micro cracks, which are electron emission sources, when a current flows on the surface of the conductive thin film by applying a voltage between the electrodes.

MIM and MIS type electron emission devices, that is, devices that have a metal-dielectric layer-metal (MIM type) structure or a metal-dielectric layer-semiconductor (MIS type) structure, make use of the principle that when voltages are applied to two metals having a dielectric layer therebetween or to a metal and a semiconductor having a dielectric layer therebetween, electrons migrate from the metal or the semiconductor having a high electron potential to the metal having a low electron potential.

A BSE type electron emission device includes an electron emission source making use of the principle that electrons travel without scattering when the size of a semiconductor is smaller than the mean-free-path of electrons in the semiconductor. To form the electron emission source, an electron supply layer formed of a metal or a semiconductor is formed on an ohmic electrode, and an insulating layer and a metal thin film are formed on the electron supply layer. When a voltage is applied between the ohmic electrode and the metal thin film, the electron emission source emits electrons.

FEA type electron emission devices can be classified into top gate devices and bottom gate devices according to the location of a cathode electrode and a gate electrode, and can be classified as diodes, triodes, tetrodes, etc., according to the number of electrodes they include. An example of a display device that uses an FEA type electron emission device is depicted in FIGS. 1 and 2.

FIG. 1 is a partial perspective view of a conventional top gate type electron emission display device 100, and FIG. 2 is a cross-sectional view taken along line II-II of FIG. 1.

Referring to FIGS. 1 and 2, the conventional electron emission display device 100 includes an electron emission device 101 and a front panel 102, which are located parallel to each other and form a vacuum light emitting space 103, and a spacer 60 that maintains a gap between the electron emission device 101 and the front panel 102.

The electron emission device 101 includes a first substrate 110, a plurality of gate electrodes 140 and a plurality of cathode electrodes 120 crossing the gate electrodes 140 on the first substrate 110, and an insulating layer 130 which is located between the gate electrodes 140 and the cathode electrodes 120 and electrically insulates the gate electrodes 140 from the cathode electrodes 120.

A plurality of electron emission source holes 131 are formed on regions where the gate electrodes 140 cross the cathode electrodes 120. An electron emission source 150 is formed in each of the electron emission source holes 131.

The front panel 102 includes a second substrate 90, an anode electrode 80 located on the lower surface of the second substrate 90, and a plurality of phosphor layers 70 located on the lower surface of the anode electrode 80.

A display device that displays an image using an FEA type electron emission device often has non-uniform brightness. In addition, since the distances between the gate electrode and tips of a carbon nanotube (CNT) in each electron emission source are not uniform, current density is reduced and uniform brightness cannot be obtained. The non-uniformity in brightness between pixels greatly impairs the quality of the image, and thus, should be prevented.

SUMMARY OF THE INVENTION

Aspects of the present invention provide an electron emission device which can uniformly emit electrons and can be simply manufactured at a reduced cost, and a display apparatus having an improved uniform brightness of pixels by using the electron emission device.

Aspects of the present invention also provide a simple method of manufacturing the electron emission device.

According to an aspect of the present invention, there is provided an electron emission device including: a first substrate; a cathode electrode and an electron emission unit disposed on the first substrate; a gate electrode electrically insulated from the cathode electrode; an insulating layer disposed between the cathode electrode and the gate electrode to insulate the cathode electrode from the gate electrode; and an electron emission source comprising a plurality of carbon nanotubes (CNTs) that contact the cathode electrode at one end and comprise a tip at the other end separated from a gate electrode by a distance, wherein the distance between the gate electrode and the tip of each of the CNTs is uniform.

According to another aspect of the present invention, there is provided an electron emission display device including: a first substrate; a plurality of cathode electrodes disposed on the first substrate; a plurality of gate electrodes crossing the cathode electrodes; an insulating layer interposed between the cathode electrodes and the gate electrodes to insulate the cathode electrodes from the gate electrodes; a plurality of electron emission source holes, each formed in a region where a cathode electrode and a gate electrode cross each other; a plurality of electron emission sources, each comprising a plurality of CNTs which are formed in a electron emission source hole and contact one of the cathode electrodes, wherein each CNT contacts the cathode electrode at one end and comprises a tip at the other end separated from the gate electrode by a distance; a second substrate disposed substantially parallel to the first substrate; an anode electrode disposed on the second substrate; and a phosphor layer disposed on the anode electrode, wherein, regarding each electron emission source, the distance between the gate electrode and the tip of each of the CNTs is uniform.

According to another aspect of the present invention, there is provided a method of manufacturing an electron emission device, the method including: sequentially forming a substrate, a cathode electrode, an insulating layer, and a gate electrode; forming a mask pattern having a predetermined thickness on a top surface of the gate electrode using a photoresist; forming an electron emission source hole by partly etching the gate electrode, the insulating layer, and the cathode electrode using the mask pattern; preparing catalyst metal having different particle sizes in the electron emission source hole; and vertically growing the catalyst metal in the electron emission source hole using a chemical vapor deposition (CVD) method and manufacturing CNTs in the electron emission source hole wherein distances from the gate electrode to tips of the CNTs are uniform.

According to another aspect of the present invention, there is provided an electron emission device comprising a first substrate; a cathode electrode disposed on the first substrate; a gate electrode electrically insulated from the cathode electrode; an insulating layer disposed between the cathode electrode and the gate electrode to insulate the cathode electrode from the gate electrode; and an electron emission source having a center portion and an edge portion and comprising a plurality of carbon nanotubes (CNTs) that each contact the cathode electrode at one end, wherein the CNTs are vertically oriented and wherein the CNTs at the center portion are longer than the CNTs at the edge portion.

According to another aspect of the present invention, there is provided a method of forming an electron emission source on a cathode electrode substrate, wherein the electron emission source has a center portion and an edge portion and comprises a plurality of carbon nanotubes (CNTs) that each contact the cathode electrode substrate at one end, wherein the CNTs are vertically oriented and wherein the CNTs at the center portion are longer than the CNTs at the edge portion, the method comprising depositing a catalyst metal onto the cathode electrode substrate, wherein catalyst metal particles having relatively smaller diameters are deposited at a center portion corresponding to the center portion of the electron emission source to be formed and wherein catalyst metal particles having relatively larger diameters are deposited at an edge portion corresponding to the edge portion of the electron emission source to be formed, and growing CNTs from the catalyst metal by a deposition process.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
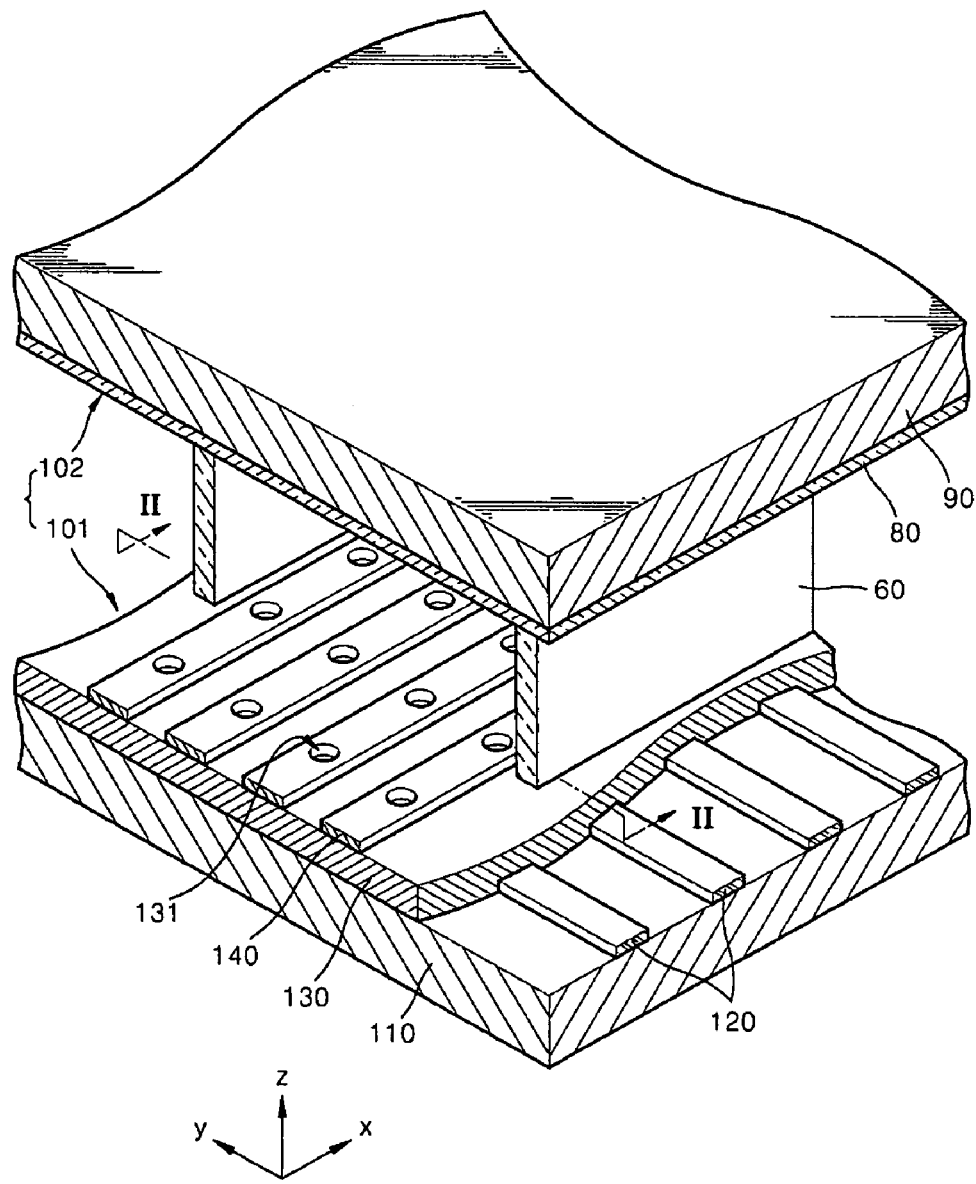
FIG. 1 is a partial perspective view of a conventional top gate type electron emission display device.
Figure 2:
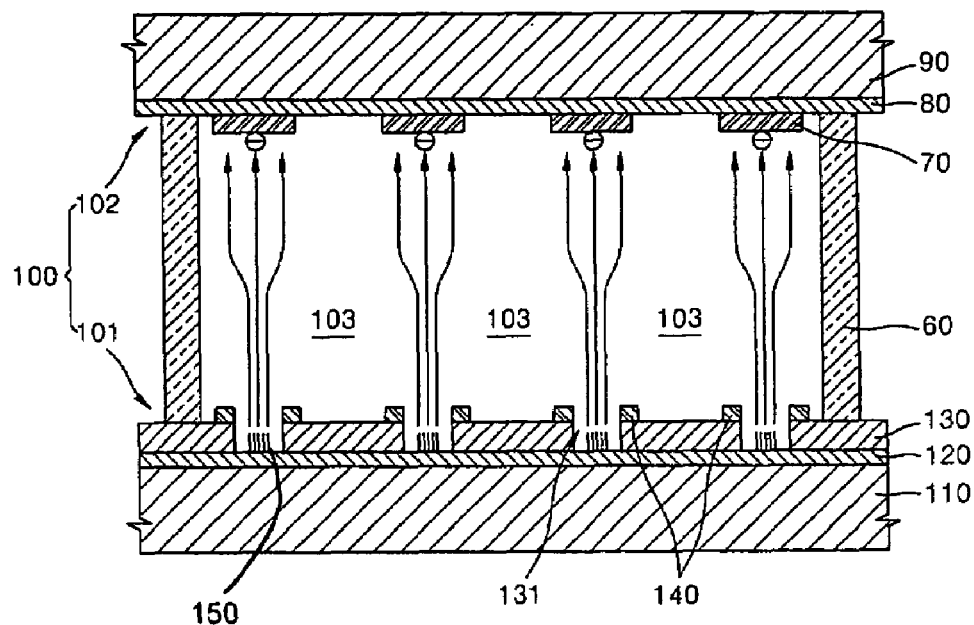
FIG. 2 is a cross-sectional view taken along line II-II of FIG. 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
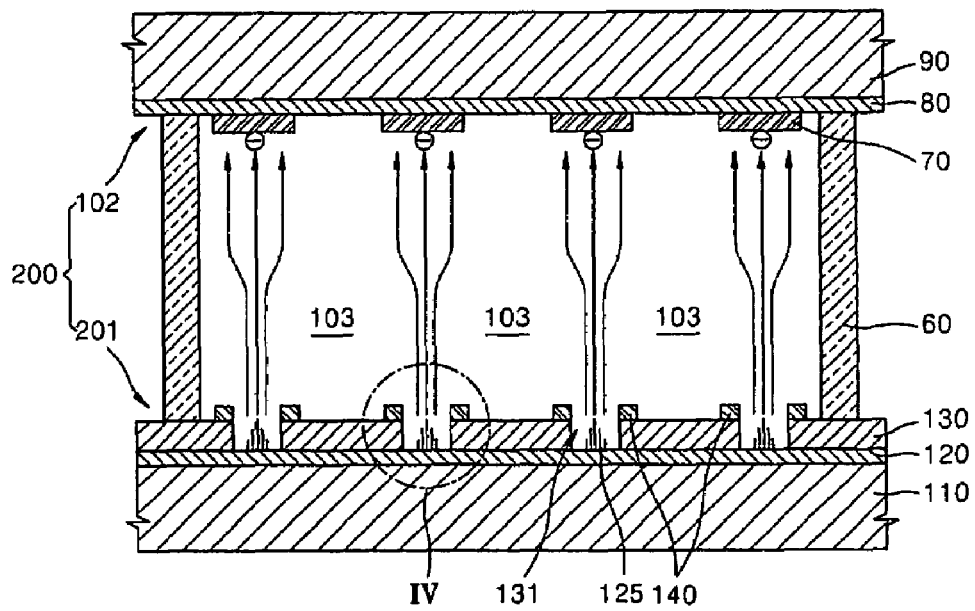
FIG. 3 is a cross-sectional view of a display device including an electron emission device according to an embodiment of the present invention.
Figure 4:
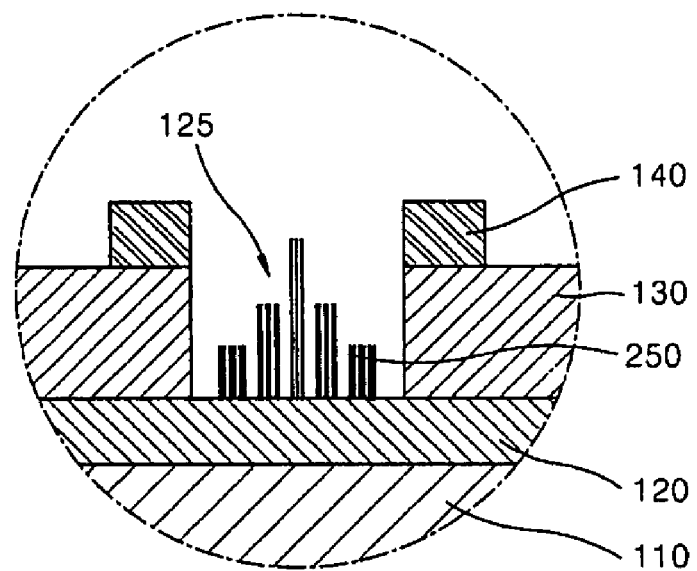
FIG. 4 is an enlarged view of portion IV of FIG. 3.

FIG. 3 is a cross-sectional view of a display device 200 including an electron emission device 201 according to an embodiment of the present invention, and FIG. 4 is an enlarged view of portion IV of FIG. 3.

Referring to FIGS. 3 and 4, the electron emission device 201 includes a first substrate 110, a cathode electrode 120, a gate electrode 140, a first insulating layer 130, and an electron emission source 125, which comprises a plurality of carbon nanotubes (CNTs) 250.

The first substrate 110 can be a board having a predetermined thickness, or a glass substrate formed of quartz glass, glass containing a small amount of an impurity such as Na, plate glass, glass coated with $SiO_2$, an aluminum oxide, or a ceramic. Also, if the display device is a flexible display apparatus, the first substrate 110 can be formed of a flexible material.

The cathode electrode 120 extends in one direction on the first substrate 110. The cathode electrode 120 can be formed of a common electrically conductive material, such as, for example, a metal such as Al, Ti, Cr, Ni, Au, Ag, Mo, W, Pt, Cu, Pd, etc., or an alloy of such metals; a printed conductive material made by mixing glass with a metal such as Pd, Ag, $RuO_2$, Pd—Ag, etc. or a metal oxide of such metals; a transparent conductive material such as $In_2O_3$, $SnO_2$, etc.; or a semiconductor material such as polycrystalline silicon, etc.

The gate electrode 140 is disposed above the cathode electrode 120, with the insulating layer 130 therebetween. The gate electrode 140 can be formed of a common electric conductive material similar to those indicated above for the cathode electrode 120.

The insulating layer 130 is interposed between the gate electrode 140 and the cathode electrode 120 to prevent a short circuit between the gate electrode 140 and the cathode electrode 120.

The electron emission source 125 is electrically connected to the cathode electrode 120, and disposed below the gate electrode 140. The electron emission source 125 may have a needle structure. Particularly, the electron emission source 125 may be formed of a carbon base material such as CNTs having a low work function and high β function, graphite, diamond, diamond like carbon, etc. Particularly, CNTs are easily driven at a low voltage due to their high electron emission characteristic. Therefore, CNTs are suitable for large screen display devices.

The electron emission source 125 may be formed using a chemical vapor deposition (CVD) growing method. In other words, CNTs may be chemically deposited in holes of the electron emission source 125 such that stable and highly efficient CNTs 250 can grow vertically. The lengths of CNTs vertically grown at the center of the electron emission source 125 may be longer than those of CNTs vertically grown on the edges thereof.

FIG. 4 is an enlarged view of the electron emission source 125 of FIG. 3. As shown in FIG. 4, the the CNTs 250 are longest at the center of the electron emission source 125 and become progressively shorter towards the edges of the electron emission source 125.

As a result, the CNTs 250 of the electron emission source 125 taken together form a cone shape. Moreover, the distance between the gate electrode 140, or more specifically, from the closest point of the gate electrode 140 to the CNTs 140 and the tips of the CNTs 250 is uniform. This is because for each CNT 250, the distance between the tip of the CNT 250 and the closest point of the gate electrode 140 has a vertical component and a lateral component. The tips of CNTs near the center of the electron emission source 125 are farther away laterally from the gate electrode 140, but are closer vertically, whereas the tips of CNTs near the edge of the electron emission source 125 are farther away vertically from the gate electrode, but are closer laterally. As a result, the distance between all of the tips of the CNTs and the gate electrode 140 are approximately equal. By providing a uniform distance between the tips of the CNTs and the gate electrode 140, a uniform electric field can be applied across all of the CNTs 250 of an electron emission source 125.

To form the CNTs 250 in a desired region of a substrate 110, a catalyst metal acting as a catalyst may be used. Particles of catalyst metal having small diameters may be disposed at the center of the electron emission source 125, and particles of the catalyst metal having larger diameters may be disposed on the edges of the electron emission source 125. The growth rate at which CNTs 250 grow is in inverse proportion to the particle size of the catalyst metal. Therefore, the lengths that the CNTs 250 grow vertically can be adjusted by controlling the particle size of the catalyst metal. Due to their small diameters, the particles of the catalyst metal disposed at the center of the electron emission source 125 grow faster than the particles of the catalyst metal on the edges of the electron emission source 125. Therefore, the growth rate and particle size of the metal catalyst should be considered to keep the distance between the gate electrode 140 and the tip of the vertically grown CNTs 250 uniform.

Figure 5:
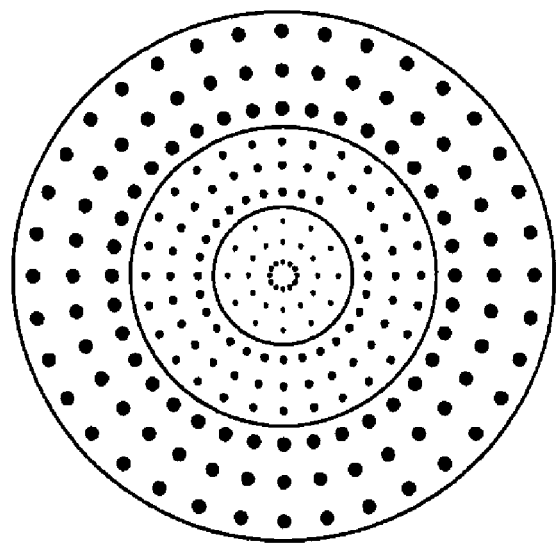
FIG. 5 is a plan view of an electron emission source according to an embodiment of the present invention.

FIG. 5 is a plan view of an electron emission source according to an embodiment of the present invention. Referring to FIG. 5, the particle size increases from an inner circumference toward an outer circumference of the electron emission source. Therefore, CNTs can grow to have different lengths while the same catalyst metal grows. As a result, the CNTs whose lengths are longer at the center than on the edges of the electron emission source can be obtained.

The electron emission device 201 structured as described above applies a negative voltage to the cathode electrode 120 and a positive voltage to the gate electrode 140 such that the electron emission source 125 can uniformly emit electrons.

The electron emission device 201 can be used for a display device that creates an image by generating visible light. The display device 200 further includes a second substrate 90 parallel to the first substrate 110 of the electron emission device 201, an anode electrode 80 disposed on the second substrate 90, and phosphor layers 70 disposed on the anode electrode 80.

To provide a device that displays an image instead of simply operating as a lamp for generating visible light, the cathode electrodes 120 and the gate electrodes 140 may cross each other.

Electron emission source holes 131 are formed in the regions where the gate electrodes 140 and the cathode electrodes 120 cross each other, and the electron emission sources 125 are disposed in the electron emission source holes 131. In other words, an array may be formed of electron emission sources 125 at the intersections of gate electrodes 140 and cathode electrodes 120, and individual electron emission sources 125 may be selectively addressed to be turned on or off by controlling individual gate electrodes 140 and cathode electrodes 120 so that an image may be formed.

The electron emission device 201 that includes the first substrate 110 and the front panel 102 that includes the second substrate 90 are separated a predetermined distance and face each other to form a light emission space 103. A plurality of spacers 60 are formed between the electron emission device 201 and the front panel 102 to maintain the gap therebetween. The spacers 60 may be formed of an insulating material.

Also, to form a vacuum in the light emission space 103, the perimeter of the light emission space 103 formed by the electron emission device 201 and the front panel 102 is sealed using glass frit, and air in the light emission space 103 is exhausted.

The operation of the electron emission display device 200 will now be described.

To induce the emission of electrons from the electron emission source 125 disposed on the cathode electrode 120, a negative voltage is applied to the cathode electrode 120 and a positive voltage is applied to the gate electrode 140. Also, a strong positive voltage is applied to the anode electrode 80 to accelerate the electrons traveling toward the anode electrode 80. When the voltages are applied to the electrodes as described above, the electrons emitted from the electron emission source 125 travel toward the gate electrode 140 and are accelerated toward the anode electrode 80. The accelerated electrons generate visible light by colliding with the phosphor layer 70 disposed on the anode electrode 80.

The brightness uniformity of pixels and the image quality of the display device 200 are improved since the current density of electrons emitted from the electron emission sources 125 that constitute pixels is uniformly distributed, since in the electron emission sources 125 that make up the electron emission device 201, all of the CNTs 250 have tips that are a uniform distance from the gate electrode 140.

A method of manufacturing an electron emission device according to an embodiment of the present invention will now be described. The method described herewith is only an example, and the present invention is not limited thereto.

A first substrate 110, a cathode electrode 120, an insulating layer 130, and a gate electrode 140 are sequentially stacked to a predetermined thickness using respective materials for each of the elements. The stacking may be performed using a process such as screen printing.

Next, a mask pattern having a predetermined thickness is formed on the upper surface of the gate electrode 140. The mask pattern, which will be used for forming electron emission source holes 131, may be formed through a photography process, that is, the mask pattern may be formed using UV rays or an E-beam after a photoresist (PR) is coated on the upper surface of the gate electrode 140.

Next, the electron emission source holes 131 are formed by patterning the gate electrode 140, the insulating layer 130, and the cathode electrode 120 using the mask pattern. The etching process can be wet etching using an etching solution, dry etching using a corrosive gas, or micro machining using an ion beam according to the material composition and thickness of the gate electrode 140, the insulating layer 130, and the cathode electrode 120.

There are largely two methods of manufacturing an electron emission source of an electron emission device.

In the first method, CNTs are formed using an arc discharge method. After refining the CNTs, the CNTs are mixed with a binder. Then, a CNT array is manufactured using a screen print method. The electron emission source can be easily manufactured using the first method. However, since it is difficult to form a gate electrode, the current cannot be easily controlled.

The second method of manufacturing an electron emission source uses a CVD method. Specifically, CNTs are selectively grown and synthesized in predetermined pixels using the CVD method. When the second method is used, a high current density can be obtained, thereby facilitating current control.

The electron emission source 125 according to an aspect of the present invention may be manufactured using a deposition method such as, for example, a CVD growing method to provide stable, vertically grown CNTs in the electron emission source holes 131. To form the CNTs 250 in a desired region of a substrate, a catalyst metal acting as a catalyst is used. The catalyst metal may be Co, Fe or Ni, and a deposition method may be a DC or RF sputtering method. Using the DC or RF sputtering method, the catalyst metal is deposited to a thickness of 50-70 nm. When the deposited catalyst metal is heat-processed at a temperature of 700-800° C., the catalyst metal forms into grains shaped like water drops. The CNTs 250 may grow from such grains.

Using the CVD method, CNTs 250 may selectively be deposited or grown on the substrate on which the catalyst metal is deposited, depending on the material of the substrate. In other words, in a selective deposition method, when the substrate is formed of $SiO_2$, Pt, or Au, CNTs do not grow thereon. Therefore, when such material is patterned and CNT is deposited on the material, the CNT does not grow on the material.

In this regard, according to an aspect of the present invention, catalyst metal is formed in regions in which the growth of CNTs 250 is desired and material such as $SiO_2$, Pt, or Au is formed in regions in which the growth of CNTs 250 is not desired. After the regions are patterned, the CNTs 250 are selectively formed using the CVD method to create the electron emission sources 125.

Catalyst metal having different particle diameters is prepared. Particles of catalyst metal having small diameters may be disposed at the center of the electron emission source 125, and particles of the catalyst metal having larger diameters may be disposed on the edges of the electron emission source 125. The growth rate at which the CNTs 250 grow is in inverse proportion to the particle size of the catalyst metal. Therefore, the lengths of the CNTs 250 that grow vertically can be adjusted by controlling the particle size of the catalyst metal.

Due to their small diameters, the particles of the catalyst metal disposed at the center of the electron emission source 125 grow faster than the particles of the catalyst metal on the edges of the electron emission source 125. The particle size increases from an inner circumference toward an outer circumference of the electron emission source 125. Therefore, the CNTs 250 can grow to have different lengths while the same catalyst metal grows. As a result, an electron emission source wherein CNTs 250 at the center are longer than CNTs 250 on the edges can be obtained.

Since the lengths of the CNTs 250 disposed at the center of the electron emission source 125 may be longer than those of the CNTs 250 disposed on the edges thereof, the electron emission sources 125 manufactured as described above may have a overall cone shape, and the distance between the gate electrode 140 and the tips of the CNTs 250 is uniform. Therefore, a uniform electric field can be applied across the entire electron emission source 125.

Figure 6:
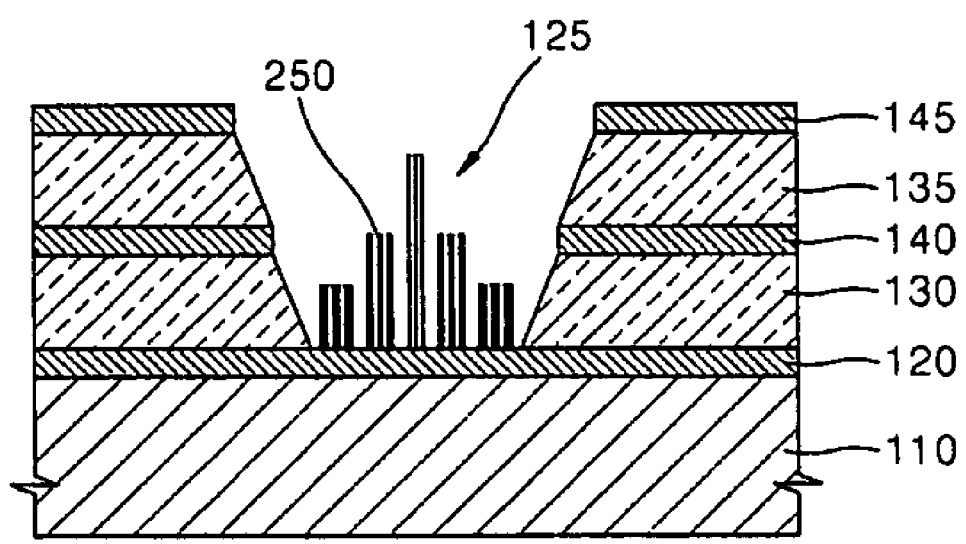
FIG. 6 is a cross-sectional view of a display device including an electron emission device according to another embodiment of the present invention.

FIG. 6 is a cross-sectional view of a display device including an electron emission device according to another embodiment of the present invention. Referring to FIG. 6, the electron emission device of this embodiment further includes a second insulating layer 135 and a focusing electrode 145 in addition to the components of the electron emission device 201 illustrated in FIG. 3.

The focusing electrode 145 is electrically insulated from the gate electrode 140 by the second insulating layer 135. Also, the focusing electrode 145 enables electrons which are emitted from the electron emission source 125 to travel along a straight path toward the anode electrode 80 of the front panel 102 illustrated in FIG. 3 when acted upon by the electric field formed by the cathode electrode 120 and the gate electrode 140. The focusing electrode 145 is formed of a material having high electrical conductivity like the material forming the cathode electrode 120 and the gate electrode 140. Although the electron emission device of FIG. 6 further includes the focusing electrode 145, the distance between the gate electrode and the tips of the CNTs continues to be uniform. Therefore, the electron emission source can uniformly emit electrons. Also, a display device that employs the electron emission device including the focusing electrode 145 can provide increased brightness and uniformity of pixels through electron focusing by the focusing electrode 145 and the uniform voltage obtained by the CNTs 250.

As described above, an electron emission source according to aspects of the present invention can uniformly emit electrons, and a display device including an electron emission device that includes the electron emission source can obtain a uniform brightness of pixels. In addition, the effect of uniform electron emission can further be enhanced by adding a focusing electrode to the electron emission device.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electron emission device comprising:
a first substrate;
a cathode electrode disposed on the first substrate;
a gate electrode electrically insulated from the cathode electrode;
an insulating layer disposed between the cathode electrode and the gate electrode to insulate the cathode electrode from the gate electrode; and an electron emission source comprising a plurality of carbon nanotubes (CNTs) that each contact the cathode electrode at one end and comprise a tip at another end separated from the gate electrode by a distance,
wherein the distance between the gate electrode and the tip of each of the CNTs is uniform,
wherein the CNTs are vertically grown,
wherein the lengths of CNTs at the center of the electron emission source are longer than the lengths of CNTs on edges of the electron emission source, and
wherein the diameters of the CNTs on the edges of the electron emission source are greater than the diameters of the CNTs at the center of the electron emission source.

2. The electron emission device of claim 1, wherein the CNTs are vertically grown and wherein all of the CNTs taken together form a cone shape.

3. The electron emission device of claim 1, further comprising:
a second insulating layer covering a top surface of the gate electrode; and
a focusing electrode insulated from the gate electrode by the second insulating layer and disposed parallel to the gate electrode.

4. The electron emission device of claim 1, wherein the cathode electrode and the gate electrode cross each other.

5. An electron emission display device comprising:
a first substrate;
a plurality of cathode electrodes disposed on the first substrate;
a plurality of gate electrodes crossing the cathode electrodes;
an insulating layer interposed between the cathode electrodes and the gate electrodes to insulate the cathode electrodes from the gate electrodes;
a plurality of electron emission source holes, each formed in a region where a cathode electrode and a gate electrode cross each other;
a plurality of electron emission sources, each comprising a plurality of carbon nanotubes (CNTs) which are formed in one of the electron emission source holes and contact one of the cathode electrodes, wherein each CNT contacts the cathode electrode at one end and comprises a tip at the other end separated from the gate electrode by a distance;
a second substrate disposed substantially parallel to the first substrate;
an anode electrode disposed on the second substrate; and
a phosphor layer disposed on the anode electrode,
wherein, regarding each electron emission source, the distance between the gate electrode and the tip of each of the CNTs is uniform,
wherein the CNTs are vertically grown,
wherein the lengths of CNTs at the center of the electron emission source are longer than the lengths of CNTs on edges of the electron emission source, and
wherein the diameters of the CNTs on the edges of the electron emission source are greater than the diameters of the CNTs at the center of the electron emission source.

6. The display device of claim 5, wherein, regarding each electron emission source, the CNTs are vertically grown and the all of the CNTs taken together form a cone shape.

7. The display device of claim 5, further comprising:
a second insulating layer covering top surfaces of the gate electrodes; and
a focusing electrode insulated from the gate electrodes by the second insulating layer and disposed parallel to the gate electrodes.

8. A method of manufacturing an electron emission device, the method comprising:
sequentially forming a substrate, a cathode electrode, an insulating layer, and a gate electrode;
forming a mask pattern having a predetermined thickness on a top surface of the gate electrode using a photoresist;
forming an electron emission source hole by partly etching the gate electrode, the insulating layer, and the cathode electrode using the mask pattern;
preparing a catalyst metal having different particle sizes in the electron emission source hole, wherein particles of the catalyst metal having small diameters are disposed at the center of the electron emission source and particles of the catalyst metal having larger diameters are disposed on edges of the electron emission source; and
vertically growing the catalyst metal in the electron emission source hole using a deposition method and manufacturing carbon nanotubes (CNTs) in the electron emission source hole wherein distances from the gate electrode to tips of the CNTs are uniform,
wherein, in the vertical growth of the catalyst metal and the manufacturing of the CNTs, CNTs vertically grown at the center of the electron emission source are longer than CNTs vertically grown on edges of the electron emission source.

9. An electron emission device comprising:
a first substrate;
a cathode electrode disposed on the first substrate;
a gate electrode electrically insulated from the cathode electrode;
an insulating layer disposed between the cathode electrode and the gate electrode to insulate the cathode electrode from the gate electrode; and
an electron emission source having a center portion and an edge portion and comprising a plurality of carbon nanotubes (CNTs) that each contact the cathode electrode at one end, wherein the CNTs are vertically oriented, wherein the CNTs at the center portion are longer than the CNTs at the edge portion, and wherein the CNTs at the center portion have a smaller diameter than the CNTs at the edge portion.

10. The electron emission device of claim 9, wherein all of the CNTs of the electron emission source taken together form a cone shape.

11. A method of forming an electron emission source on a cathode electrode substrate, wherein the electron emission source has a center portion and an edge portion and comprises a plurality of carbon nanotubes (CNTs) that each contact the cathode electrode substrate at one end, wherein the CNTs are vertically oriented and wherein the CNTs at the center portion are longer than the CNTs at the edge portion, the method comprising
depositing a catalyst metal onto the cathode electrode substrate, wherein catalyst metal particles having relatively smaller diameters are deposited at a center portion corresponding to the center portion of the electron emission source to be formed and wherein catalyst metal particles having relatively larger diameters are deposited at an edge portion corresponding to the edge portion of the electron emission source to be formed such that the diameters of the catalyst metal particles gradually increase from relatively smaller diameter particles deposited at a center portion corresponding to the center portion of the electron emission source to be formed to relatively larger diameter particles at an edge portion corresponding to the edge portion of the electron emission source to be formed, and growing CNTs from the catalyst metal by a deposition process such that relatively longer CNTs are grown at the center portion of the electron emission source and relatively shorter CNTs are grown at the edge portion of the electron emission source.

12. The method of forming an electron emission source according to claim 11, wherein all of the CNTs of the electron emission source taken together form a cone shape.

* * * * *